United States Patent
Ogawa et al.

(10) Patent No.: US 9,143,877 B2
(45) Date of Patent: Sep. 22, 2015

(54) ELECTROMECHANICAL TRANSDUCER DEVICE AND METHOD OF MAKING THE SAME

(75) Inventors: Toshiyuki Ogawa, Yokohama (JP); Makoto Takagi, Kawasaki (JP); Kazuhiko Kato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 534 days.

(21) Appl. No.: 12/839,701

(22) Filed: Jul. 20, 2010

(65) Prior Publication Data
US 2011/0018387 A1    Jan. 27, 2011

(30) Foreign Application Priority Data

Jul. 24, 2009 (JP) ................................. 2009-172723
Apr. 20, 2010 (JP) ................................. 2010-096557

(51) Int. Cl.
 *H02N 1/08* (2006.01)
 *H04R 31/00* (2006.01)
 *B06B 1/02* (2006.01)

(52) U.S. Cl.
 CPC .............. *H04R 31/00* (2013.01); *B06B 1/0292* (2013.01); *H02N 1/08* (2013.01); *Y10T 29/49005* (2015.01)

(58) Field of Classification Search
 CPC ......... B06B 1/0292; H02N 1/08; H04R 31/00
 USPC ..................... 310/309, 300; 257/416; 600/459
 See application file for complete search history.

(56) References Cited

U.S. PATENT DOCUMENTS

| | | | |
|---|---|---|---|
| 6,109,113 A * | 8/2000 | Chavan et al. | 73/718 |
| 6,430,109 B1 | 8/2002 | Khuri-Yakub | |
| 2006/0075818 A1 | 4/2006 | Huang | |
| 2007/0013269 A1 * | 1/2007 | Huang | 310/334 |
| 2007/0180916 A1 | 8/2007 | Tian | |
| 2007/0299345 A1 * | 12/2007 | Adachi et al. | 600/459 |
| 2008/0048211 A1 * | 2/2008 | Khuri-Yakub et al. | 257/204 |
| 2008/0259725 A1 * | 10/2008 | Bayram et al. | 367/7 |
| 2009/0320274 A1 * | 12/2009 | Kato et al. | 29/596 |
| 2011/0073968 A1 * | 3/2011 | Ezaki et al. | 257/416 |
| 2011/0140212 A1 * | 6/2011 | Itoh et al. | 257/416 |

FOREIGN PATENT DOCUMENTS

| | | |
|---|---|---|
| JP | 60077198 B | 1/1994 |
| JP | 11-176307 A | 7/1999 |
| JP | 2006-122188 A | 5/2006 |

* cited by examiner

*Primary Examiner* — Thomas Truong
(74) *Attorney, Agent, or Firm* — Canon USA, Inc. IP Division (57) ABSTRACT

Provided is an electromechanical transducer device including a substrate that is conductive, and a plurality of electromechanical transducer elements disposed on a first surface of the substrate. A groove that electrically isolates the plurality of electromechanical transducer elements from each other is formed in the substrate, the groove extending from a second surface side of the substrate toward the first surface side of the substrate, the second surface being opposite the first surface. The width of the groove on the first surface side of the substrate is smaller than the width of the groove on the second surface side of the substrate.

11 Claims, 7 Drawing Sheets

ELECTROMECHANICAL TRANSDUCER DEVICE AND METHOD OF MAKING THE SAME

BACKGROUND OF THE INVENTION

1. Field of the Invention

The present invention relates to an electromechanical transducer device, such as an ultrasonic transducer, and to a method of making the electromechanical transducer device.

2. Description of the Related Art

Ultrasonic transducers, which convert an electric signal into ultrasound and vice versa, are used as probes for medical imaging and non-destructive testing. There is a type of ultrasonic transducer called a capacitive micromachined ultrasound transducer (CMUT). A CMUT includes, for example, a substrate including a lower electrode, a membrane that is supported by a supporting unit formed on the substrate, and an upper electrode. The lower electrode, the membrane, the upper electrode, and the supporting unit surround a cavity. The CMUT emits a sound wave (oscillatory wave) when a voltage is applied between the lower electrode and the upper electrode and thereby the membrane is vibrated. On the other hand, a CMUT detects a sound wave (oscillatory wave) when the sound wave is received and vibrates the membrane and thereby the capacitance between the lower electrode and the upper electrode is changed.

Figure 6:
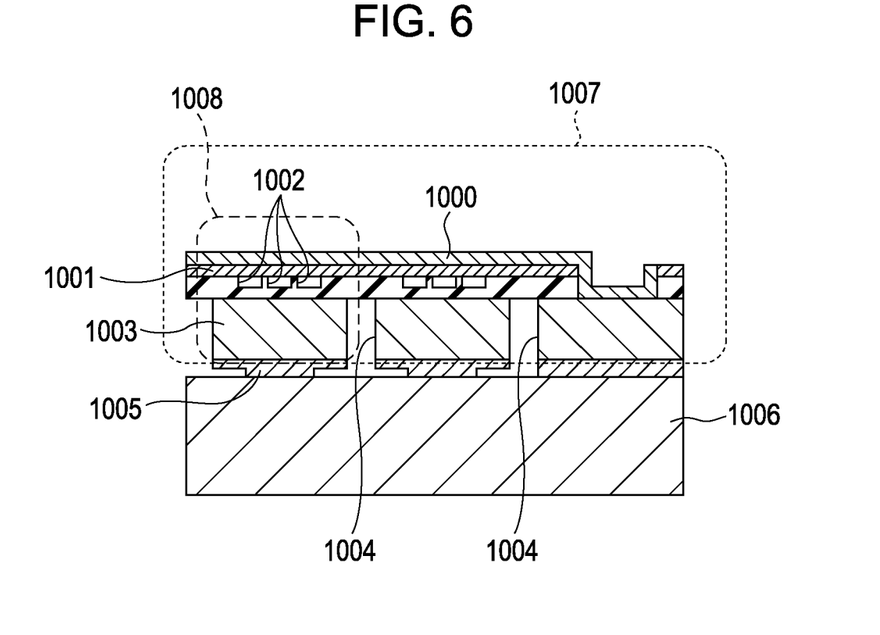
FIG. 6 is a schematic view of a CMUT of an existing technology.

Traditionally, CMUTs have been made by so-called surface micromachining, bulk micromachining, and the like. Examples of wiring methods include a method of forming an element including a plurality of membranes and cavities on a silicon substrate and connecting the element to a circuit board through the silicon substrate that serves as a lower electrode and a through-hole interconnection (US 2006/0075818 A1). Referring to FIG. 6, this method will be described. A CMUT 1007 includes a plurality of elements 1008, and each of the elements 1008 individually sends and receives ultrasound. Each of the elements 1008 includes an upper electrode 1000, a membrane 1001, a cavity 1002, and a lower electrode 1003. Grooves 1004 are formed so as to electrically isolate and insulate the elements 1008 that are adjacent to each other. The CMUT 1007 is connected to an ASIC substrate 1006 through bumps 1005.

In the existing CMUT, it is necessary to form the separation grooves each having a width of several hundred micrometers in order to electrically isolate the elements from each other, each of the elements including one or a plurality of cavities. Because the mechanical strength of a portion surrounding a cavity is low, it is necessary to support the portion with a supporting member. However, cavities cannot be formed in a region that corresponds to the separation groove (directly above the separation groove) and for which it is difficult to support a cavity. Therefore, the number of cavities that can be formed per unit area of a substrate is limited. As a result, the fill factor (which refers to the proportion of the area occupied by electromechanical transducer elements in the present specification) is reduced. Therefore, the sensitivity of the device is reduced.

SUMMARY OF THE INVENTION

The present invention provides an electromechanical transducer device including a substrate that is conductive; and a plurality of electromechanical transducer elements disposed on a first surface of the substrate. A groove that electrically isolates the plurality of electromechanical transducer elements from each other is formed in the substrate, the groove extending from a second surface side of the substrate toward the first surface side of the substrate, the second surface being opposite the first surface. The width of the groove on the first surface side of the substrate is smaller than the width of the groove on the second surface side of the substrate.

The present invention also provides a method of making an electromechanical transducer device, the method including forming a groove in a silicon substrate by performing alkali wet etching to form a plurality of first electrodes that are separated from each other, forming cavities that face the first electrodes, forming a membrane that faces the cavities, and forming second electrodes on the membrane. In the above method, forming a groove in a silicon substrate by performing alkali wet etching to form a plurality of first electrodes that are separated from each other may be replaced by forming a groove in a silicon substrate by performing dry etching a plurality of times to form a plurality of first electrodes that are separated from each other.

According to the present invention, by making the width of the groove on the first surface side of the substrate smaller than the width of the groove on the second surface side, a plurality of electromechanical transducer elements can be disposed with a comparatively high density on the first surface side. By making the width of the groove become larger from the first surface side toward the second surface side, a sufficient width is provided to the separation groove as a whole. Therefore, electrical isolation between electromechanical transducer elements can be secured and the parasitic capacity can be reduced. As a result, decrease in sensitivity, which occurs due to a small width of the groove on the first surface side, can be suppressed. Moreover, because the width of the groove on the first surface side can be reduced while suppressing decrease in sensitivity, electromechanical transducer elements can be disposed with a high density, whereby the fill factor can be increased. Also in this respect, the sensitivity of the electromechanical transducer device, such as a CMUT, can be increased. In other words, according to the present invention, the parasitic capacity between electromechanical transducer elements can be reduced while increasing the signal output of the electromechanical transducer device.

Further features of the present invention will become apparent from the following description of exemplary embodiments with reference to the attached drawings.

BRIEF DESCRIPTION OF THE DRAWINGS

FIGS. 2A-1 to 2I-2 illustrate a method of making a CMUT, the method according to a second embodiment of the present invention.

FIGS. 4A-1 to 4B-2 illustrate a method of making the CMUT according to the third embodiment of the present invention.

DESCRIPTION OF THE EMBODIMENTS

Hereinafter, embodiments of the present invention will be described. An electromechanical transducer device and a method of making the electromechanical transducer device according to the present invention is characterized by the following point. That is, in correspondence with the disposition of a plurality of electromechanical transducer elements, a conductive substrate is divided into a plurality of portions by forming narrow grooves in the substrate so that the width of the grooves on a first surface side (also referred to as the width at a bottom portion) is smaller than the width of the grooves on a second surface side (also referred to as the width at an opening), whereby a plurality of portions of the substrate that serve as electrodes are insulated from each other.

Based on this idea, the electromechanical transducer device and the method of making the electromechanical transducer device according to the invention have basic configurations described in the summary of the invention. Based on the basic configurations, the following embodiments can be realized.

Each of the groove, for example, may have a cross-sectional shape in which the width continuously or discontinuously decreases from the opening to the bottom portion (continuously or discontinuously increases from the first surface side to the second surface side). This structure has a benefit in that the parasitic capacity between electromechanical transducer elements, such as those of capacitance-type, is reduced and the fill factor of the electromechanical transducer elements can be increased. Moreover, the structure can be easily realized by forming the groove in a silicon substrate by alkali wet etching. With this method, the groove described above can be easily formed because walls of the groove can be formed so as to have an angle of 54.7 degrees with respect to the substrate by appropriately setting the thickness of the substrate and the width of the opening of the etching mask (see the second embodiment below). In this case, the side walls of the groove are inclined flat surfaces.

The side walls of the groove may be stepped surfaces. Such a structure can be easily made by performing dry etching a plurality of times, i.e., multi-step dry etching. To be specific, a first dry etching is performed after forming a mask that has an appropriate pattern corresponding to the disposition of a plurality of electromechanical transducer elements on a bottom surface of a silicon substrate, and a second dry etching is performed after appropriately enlarging the openings of the mask. A groove having stepped side walls can be made by successively performing such etching processes to gradually deepen the groove until the bottom of the groove reaches the other side of the substrate. Also with this method, the width of the groove at the bottom portion can be made smaller than the width at the opening.

Hereinafter, embodiments of the present invention will be described in detail with reference to the drawings. However, the present invention is not limited to the specifics of the embodiments.

First Embodiment

Figure 1A:
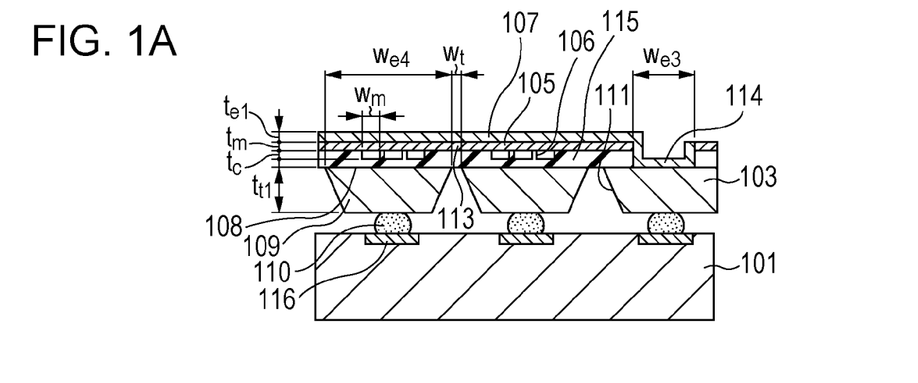
FIGS. 1A to 1C illustrate a CMUT according to a first embodiment of the present invention.
Figure 1B:
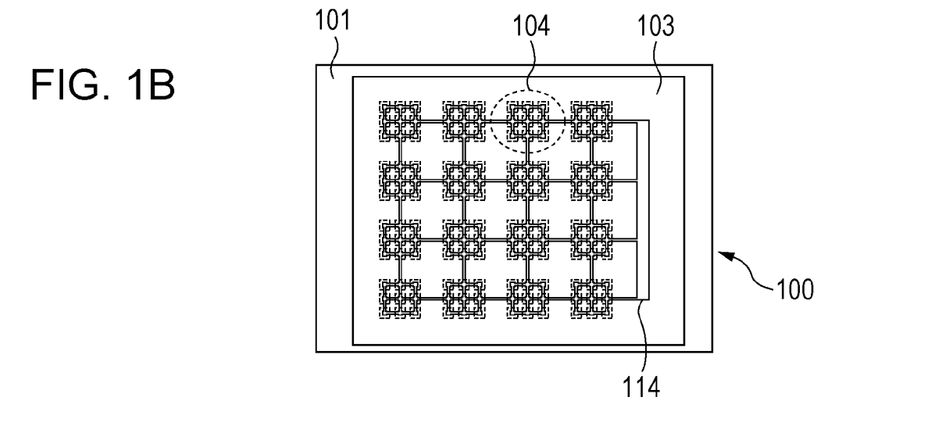
Figure 1C:
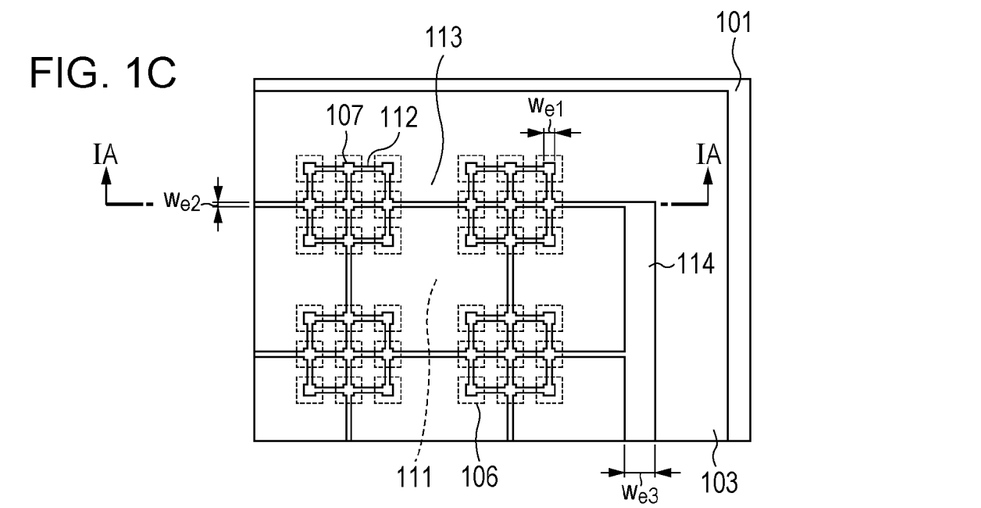

Referring to FIGS. 1A to 1C, a first embodiment will be described. The first embodiment is a capacitance-type ultrasonic transducer device that includes a silicon substrate in which elements are separated by grooves and a membrane 105 is made by joining a silicon-on-insulator (SOI) substrate to the silicon substrate. FIG. 1A is a sectional view of an electromechanical transducer device 100 according to the first embodiment. As illustrated in FIG. 1A, the electromechanical transducer device 100 includes a circuit board 101 and a silicon substrate 103. The circuit board 101 is disposed directly below the silicon substrate 103.

FIG. 1B is a top view of FIG. 1A. As illustrated in FIG. 1B, the electromechanical transducer device 100 according to the first embodiment includes 4×4 elements 104. A region surrounded by a dotted line in FIG. 1B corresponds to one of the elements 104. Each of the elements 104, which is a capacitance-type electromechanical transducer element, individually sends and receives ultrasound. The element 104 includes a lower electrode 108 and a through-hole interconnection 109 connected to the lower electrode 108. The arrangement of the elements 104 is not limited to 4×4. FIG. 1C is a partial enlarged view of FIG. 1B. FIG. 1A is a sectional view taken along line IA-IA of FIG. 1C. Referring to FIGS. 1A to 1C, the elements 104 will be described. The elements 104 are disposed on a first surface of the silicon substrate 103. Each of the elements 104 includes the membrane 105, cavities 106, upper electrodes 107, and the lower electrode 108. The membrane is made of Si, a portion surrounding the cavities 106 (excluding a portion adjacent to the membrane 105) is made of $SiO_2$, the upper electrodes 107 are made of Al, the lower electrode 108 is made of Si, and a lower lead line, i.e., the through-hole interconnection, is made of Si. The silicon substrate 103 and the circuit board 101 are joined to each other with solder 110 and electrode pads 116 disposed therebetween. As described above, in the first embodiment, each of the elements 104, which corresponds to an electromechanical transducer element, includes a supporting unit, a membrane that is disposed on the supporting unit 115, a lower electrode that faces the membrane, and an upper electrode that is disposed on the membrane. The lower electrode corresponds to a first electrode, and the upper electrode corresponds to a second electrode. The lower electrode 108 is electrically connected to a part of the silicon substrate 103 surrounded by a groove 111 (the through-hole interconnection 109). The membrane may also serve as the upper electrode. In the first embodiment, the lower electrode 108 and the through-hole interconnection 109 are independent members. However, in the present invention, the lower electrode 108 and the through-hole interconnection 109 may be integrated with each other.

The groove 111 and the lower electrode 108 will be described. As illustrated in FIGS. 1A to 1C, the groove 111 is formed in a portion of the silicon substrate 103 that substantially corresponds to a region between the elements 104 that are adjacent to each other. This is for the purpose of insulating the adjacent elements 104 from each other. As illustrated in FIG. 1A, it is necessary that the groove 111 entirely extend through a portion of the silicon substrate 103 corresponding to the lower electrode 108 and the through-hole interconnection 109. The groove 111 has a cross-sectional shape in which the width at a bottom portion, which is on a first surface side of the silicon substrate, is smaller than the width of an opening, which is on a second surface side of the substrate. Thus, parasitic capacity between adjacent elements 104 can be reduced, and the effective area per element can be increased. In the first embodiment, side walls of the groove 111 are flat and inclined with respect to the silicon substrate 103. Thus, electric discharge between adjacent element 104 is suppressed. The side walls of the groove may be continuously inclined flat or curved surfaces or, for example, surfaces that are discontinuously stepped.

Referring to FIGS. 1A to 1C, the upper electrodes 107 will be described. Wiring 112 is formed in order to connect the upper electrodes 107 of each element 104 to each other. In order to electrically connect the upper electrodes 107 of adjacent elements 104 to each other, wiring is formed on a beam 113 of the membrane 105 that substantially corresponds to the groove 111. As a result, all upper electrodes 107 are connected to lead wiring 114. As illustrated in FIG. 1A, the upper electrodes 107 are connected to the circuit board 101 through the lead wiring 114 and the silicon substrate 103.

Dimensions of each elements will be described. The membrane 105 of each cell having the cavities 106 has a width $w_m$ of 200 μm and a thickness $t_m$ of 1.5 μm. The cavities 106 have a width of 200 μm, which is the same as that of the membrane, and a depth $t_c$ of 1 μm. The bottom portion of the groove 111 has a width $w_r$ of 100 μm and a depth $t_{r1}$ of 100 μm. The upper electrode 107 illustrated in FIG. 1C has a width $w_{e1}$ of 100 μm and a thickness $t_{e1}$ of 330 nm. The wiring 112 illustrated in FIG. 1C, which connects the upper electrodes 107 to each other, has a width $w_{e2}$ of 10 μm and a thickness the same as that of the upper electrode. The lead wiring 114 has a width $w_{e3}$ of 100 μm. The lower electrode 108 has a width $w_{e4}$ of 900 μm and a thickness the same as the depth $t_{r1}$ of the groove 111 (including the through-hole interconnection 109). The electrode pad 116 has a horizontal size of 100 μm×100 μm and a thickness of 330 nm. These dimensions are examples, and may have other values. In the figures, the elements are shown in different scales for convenience of illustration. Assuming that the groove 111, which has side walls each having an angle of 54.7 degrees with respect to the surface of the substrate, is made by anisotropic etching, the groove 111 having the aforementioned width and can be easily provided with a width that is larger than 200 μm at the opening portion. Thus, the groove 111 can be easily provided with a structure in which the width on the first surface side is smaller than the width at the second surface side.

The operating principle behind the CMUT will be described. When ultrasound is received, the membrane 105 is displaced and the gap between the upper electrode 107 and the lower electrode 108 changes. By detecting and signal-processing the change in capacitance due to the change in the gap, an ultrasonic image and the like can be obtained. When emitting ultrasound, the membrane 105 is vibrated by applying a modulation voltage to the upper electrode 107 or the lower electrode 108 from the circuit board 101.

With the first embodiment, the effect of parasitic capacity between adjacent elements can be reduced, the effective area per element can be increased, and the sensitivity of the CMUT can be increased. Because the silicon substrate is used as the wiring, the structure described above has a benefit in that the cavities can be formed by surface micromachining or by bulk micromachining, which will be described in the second embodiment. A through-hole interconnection can be formed by using a method of forming a through-hole in a silicon substrate and depositing polysilicon or the like in the through hole, or by using a method of plating Cu or the like so as to form wiring. However, such methods are disadvantageous in that the cavities cannot be formed in a variety of ways.

Second Embodiment

A second embodiment will be described. The embodiment relates to a method of making the CMUT described in the first embodiment. FIGS. 2A-1 to 2I-2 illustrate a method of making a CMUT according to a second embodiment of the present invention. For convenience of illustration, sectional views of two elements are illustrated in FIGS. 2A-1 to 2I-2. Other elements can be made in the similar manner. In FIGS. 2A-1 to 2I-2, portions of the CMUT that function in the similar manner as those illustrated in FIGS. 1A to 1C are denoted by the same numerals.

Figure 2A:
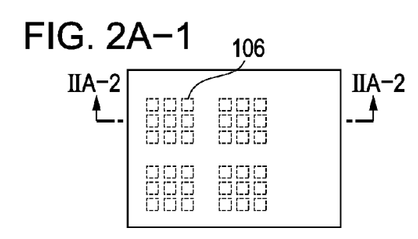
Figure 2A:
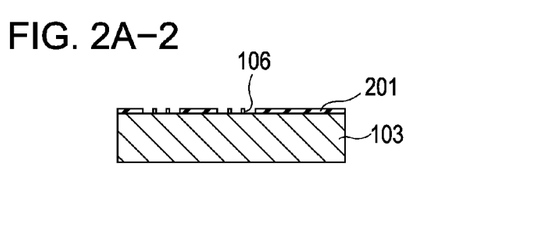

First, the silicon substrate 103 is prepared. Typically, the silicon substrate 103 is a single crystal silicon, to which semiconductor processing techniques can be easily applied. The silicon substrate 103 may have a low resistivity (i.e., a certain degree of conductivity), because the silicon substrate 103 becomes the lower electrode 108 and the through-hole interconnection 109. In the second embodiment, an Si substrate having a resistivity lower than 0.02 Ω·cm is used. Next, an oxide film 201 is formed on the silicon substrate 103 by pyrogenic oxidation, and a cavity pattern is formed by photolithography. Moreover, the cavities 106 are formed by etching the oxide film 201 using buffered hydrogen fluoride (BHF). For example, the silicon substrate 103 has a thickness of 525 μm, and the oxide film 201 has a thickness of 1 μm. FIG. 2A-1 is a top view and FIG. 2A-2 is a sectional view taken along line IIA-2-IIA-2 after the cavity pattern has been formed.

Figure 2B:
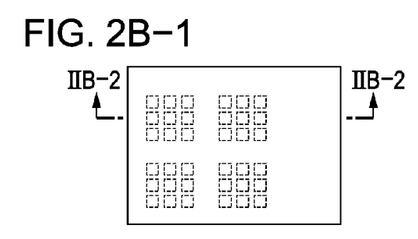
Figure 2B:
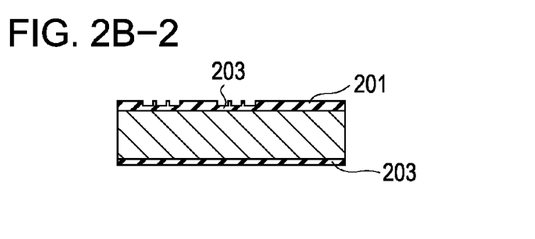
Figure 2C:
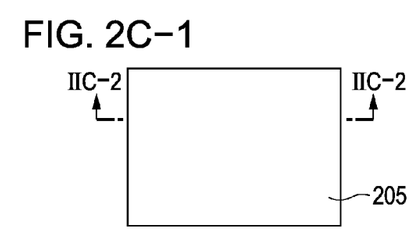
Figure 2C:
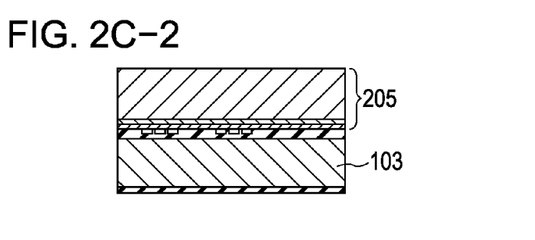

Next, the silicon substrate 103 is thermally oxidized to insulate the bottom surfaces of the cavities 106. An oxide film 203 having a thickness 1500 Å is formed. Another oxide film 203 is formed also on the lower surface of the silicon substrate 103. FIG. 2B-1 is a top view and FIG. 2B-2 is a sectional view taken along line IIB-2-IIB-2 after the oxide films 203 has been formed.

Next, an SOI substrate 205 is joined to the silicon substrate 103 illustrated in FIGS. 2B-1 and 2B-2. FIG. 2C-1 is a top view and FIG. 2C-2 is a sectional view taken along line IIC-2-IIC-2 after the SOI substrate 205 has been joined to the silicon substrate 103. The SOI substrate 205 includes a device layer (thickness 1.5 μm), an embedded oxide film layer (thickness 0.4 μm), and a supporting substrate layer (thickness 500 μm). The joining process is as follows. First, surfaces of the silicon substrate 103 and the SOI substrate 205 that are joined to each other are subjected to $N_2$ plasma treatment. Next, the silicon substrate 103 and the SOI substrate 205 are aligned to each other so that the orientation flats match with each other. Lastly, the silicon substrate 103 and the SOI substrate 205 are joined to each other in a vacuum chamber at a temperature of 300° C. and under a load of 500 N.

Figure 2D:
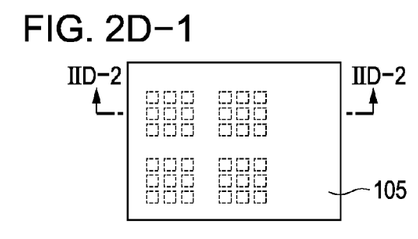
Figure 2D:
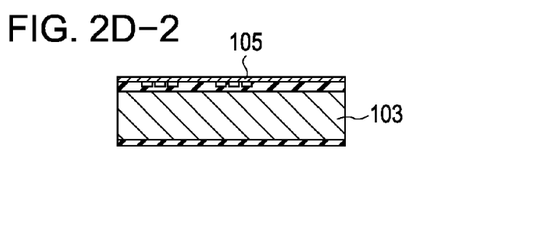
Figure 2E:
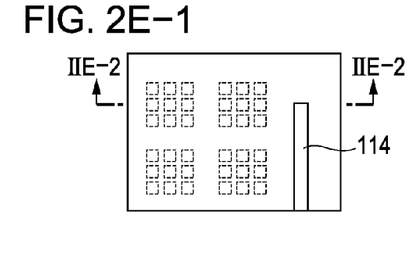
Figure 2E:
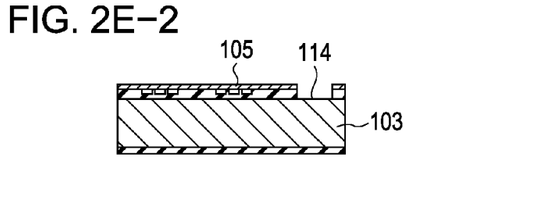
Figure 2F:
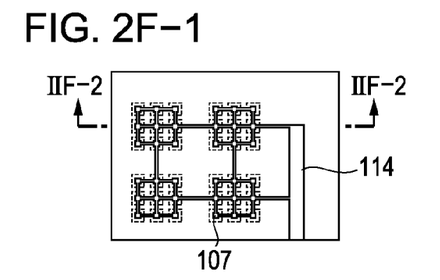
Figure 2F:
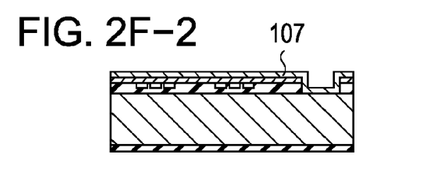
Figure 2G:
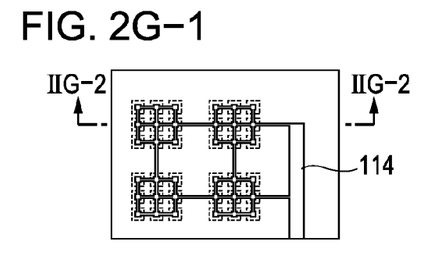
Figure 2G:
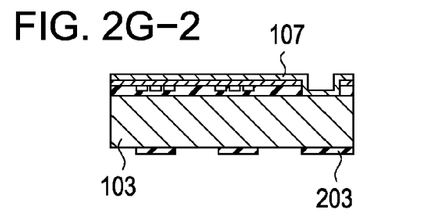
Figure 2H:
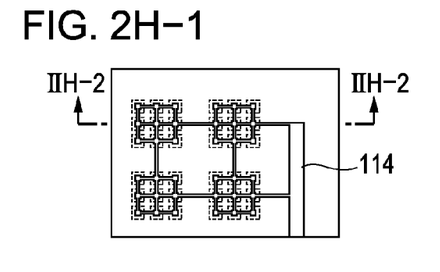
Figure 2H:
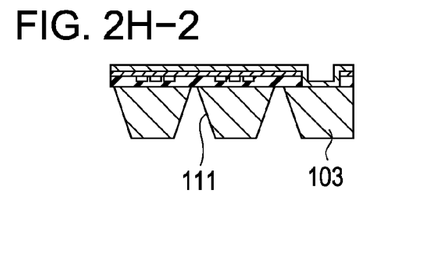
Figure 2I:
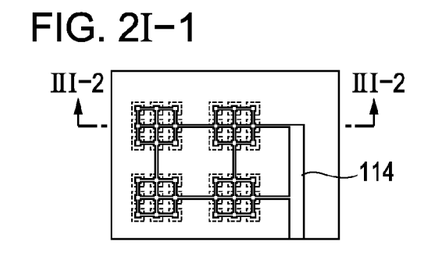
Figure 2I:
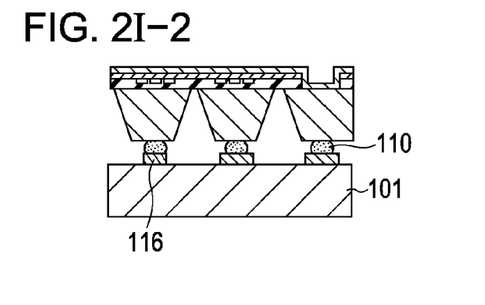

Next, a supporting substrate layer and an embedded oxide film layer of the SOI substrate 205 are removed by etching. The supporting substrate layer of the SOI substrate 205 is removed by etching using $SF_6$, and the embedded oxide film layer is removed by etching using buffered hydrogen fluoride (BHF). Thus, the membrane 105 is formed. FIG. 2D-1 is a top view and FIG. 2D-2 is a sectional view taken along line IID-2-IID-2 after the supporting substrate layer and the embedded oxide film layer have been etched.

Next, the lead wiring 114 is formed. A resist pattern for the lead wiring 114 is formed by performing photolithography on the membrane 105 side of the silicon substrate 103, which has been formed in the process illustrated in FIGS. 2D-1 and 2D-2. By using the resist a mask, the membrane 105 is dry etched using $CF_4$ gas. Likewise, by using the resist as a mask, the oxide films 201 and 203 are dry etched using $CF_4$ gas. FIG. 2E-1 is a top view and FIG. 2E-2 is a sectional view taken along line IIE-2-IIE-2 after the lead wiring 114 has been formed.

Next, the upper electrode 107 is formed. The resist is removed from the substrate, which has been made in the step illustrated in FIGS. 2E-1 and 2E-2, and Al is deposited on the substrate. The resist pattern for the upper electrode is formed by performing photolithography on the surface on which Al has been deposited. Lastly, by using the resist pattern as a mask, the Al is wet etched to form the upper electrode 107. FIG. 2F-1 is a top view and FIG. 2F-2 is a sectional view taken along line IIF-2-IIF-2 after the upper electrode 107 has been formed.

Next, the resist is removed from the substrate, which has been made in the step illustrated in FIGS. 2F-1 and 2F-2, and a resist pattern for separating the substrate into 4×4 elements 104 is formed by photolithography. The oxide film 203 is etched using BHF, and subsequently the resist is removed. The oxide film 203, which has been etched, serves as an etching mask for forming the groove 111. FIG. 2G-1 is a top view and FIG. 2G-2 is a sectional view taken along line IIG-2-IIG-2 after the etching mask has been formed.

Next, the grooves 111 are formed in the silicon substrate 103. FIG. 2H-1 is a top view and FIG. 2H-2 is a sectional view taken along line IIH-2-IIH-2 after the groove has been formed. The silicon substrate 103 is wet etched by using the oxide film 203, which has been made in the step illustrated in FIGS. 2G-1 and 2G-2, as an etching mask. The wet etching method is anisotropic wet etching using an alkaline solution. As the alkaline solution, for example, potassium hydroxide aqueous solution or tetramethylammonium hydroxide aqueous solution (TMAH) may be used. After the etching, the oxide film 203 is removed. The cross-section of the groove 111 has a trapezoidal shape such that a side at the opening is larger than the side at the bottom surface.

Lastly, the substrate made in the step illustrated in FIGS. 2H-1 and 2H-2 is joined to the circuit board 101. FIG. 2I-1 is a top view and FIG. 2I-2 is a sectional view taken along line III-2-III-2 after the circuit board 101 has been joined. Solder is used for joining the substrate to the circuit board 101. Solder paste is printed on a part of the substrate 101 that corresponds to the electrode pad 116. Next, the solder paste is reflowed so as to form a solder ball. Lastly, the positions of the electrode pads 116 of circuit elements on the circuit board 101 is aligned with the lower electrodes of the silicon substrate 103, and the circuit board 101 and the silicon substrate 103 are joined to each other by reflowing the solder 110. Thus, a structure capable of performing signal processing for sending and receiving ultrasound is formed.

As described above, the second embodiment includes forming a plurality of lower electrodes by forming grooves in a substrate by alkali wet etching, forming cavities that face the lower electrodes, forming a membrane that faces the cavities, and forming upper electrodes on the membranes. In the second embodiment, bulk micromachining is used to form a cavity structure on the silicon substrate and to join the SOI substrate to the silicon substrate. By using this method, the mechanical characteristics of the membrane is improved because a single crystal silicon is used as the membrane. Alternatively, a method using surface micromachining may be used. To be specific, for example, the method is used as follows. On a substrate on which a polysilicon layer has been formed as a sacrificial layer, a silicone nitride film is deposited so as to form a membrane, and etching holes are formed in the membrane. The polysilicon layer on the sacrificial layer is etched through the etching holes, so that cavities are formed. Lastly, the etching holes are filled with a silicone nitride film to seal the cavities. Also in this method, grooves can be formed in the substrate on which the elements have been formed.

Third Embodiment

Figure 3A:
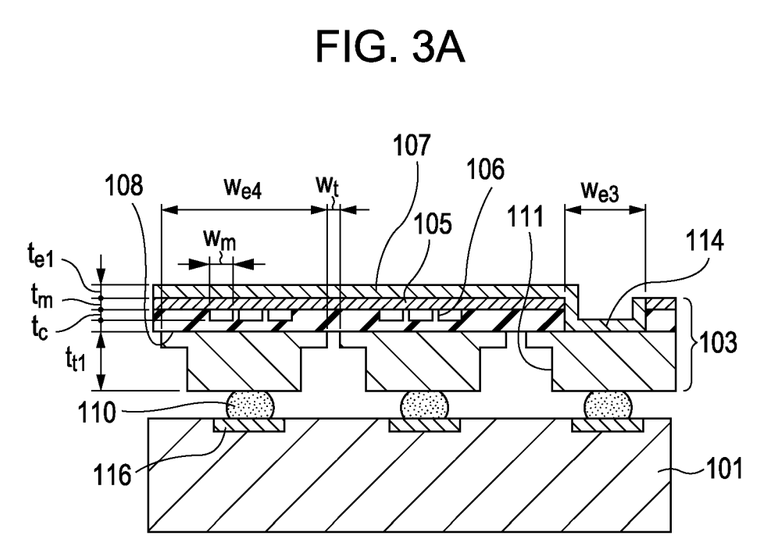
FIGS. 3A and 3B illustrate a CMUT according a third embodiment of the present invention.
Figure 3B:
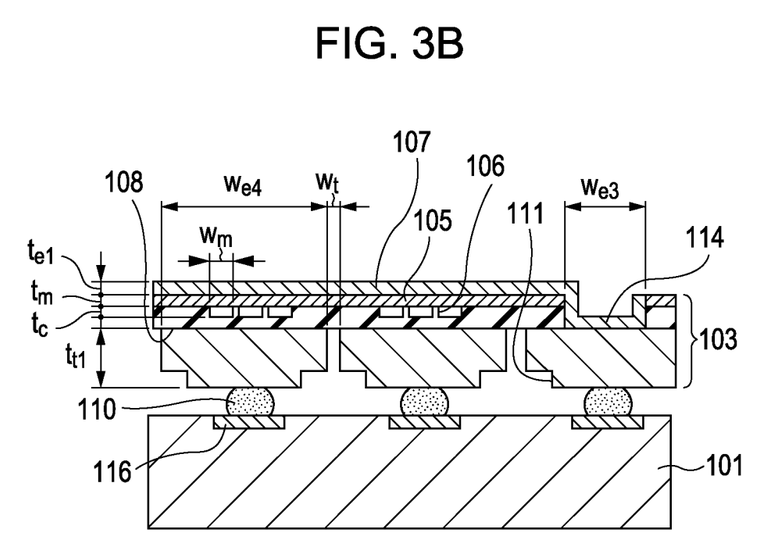

Referring to FIG. 3A, a third embodiment will be described. The third embodiment is a CMUT that is basically the same as that of the first embodiment, but differs from the first embodiment in that the groove 111 has a cross-sectional shape that is step-like. The groove 111 is characterized in that the groove 111 has a small width at a portion that is close to the element 104. By providing the groove 111 with such a cross-sectional shape, a larger number of cavities can be disposed while minimizing an increase in the parasitic capacity generated between the elements 104 that are adjacent to each other. FIG. 3B illustrates the groove 111 that has a larger width at a position that is away from the element 104. Although the number of cavities that can be disposed is the same as the case of FIG. 3A, the parasitic capacity between the adjacent element 104 increases, and the noise increases. The larger the average width of the groove in the depth direction, the smaller becomes the parasitic capacity generated between the elements 104 that are adjacent to each other. Therefore, by making the width of the groove 111 at a portion close to the element 104 smaller and the width of other portions larger, the sensitivity can be improved by increasing the number of cavities while minimizing an increase in noise due to an increase in the parasitic capacity.

Figure 4A:
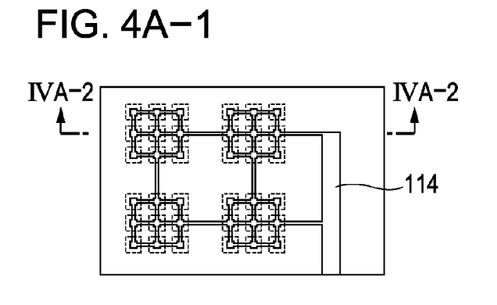
Figure 4A:
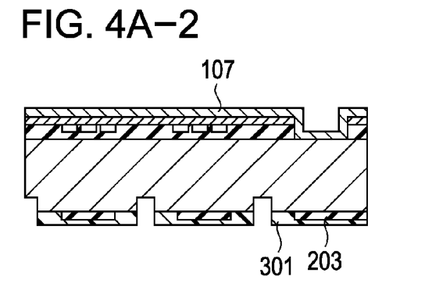
Figure 4B:
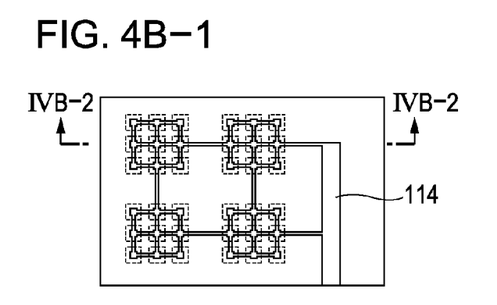
Figure 4B:
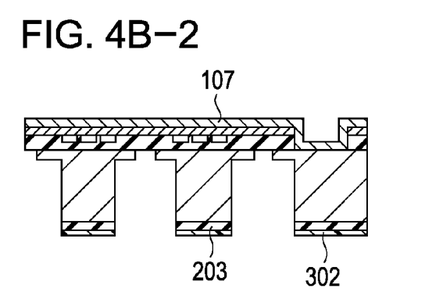

Next, referring to FIG. 4, a method of making a CMUT illustrated in FIG. 3A will be described. The method is basically the same as the second embodiment, but the step of forming the groove 111, which is illustrated FIGS. 2H-1 and 2H-2, is different. Only the method of making groove will be described here. First, a resist mask 301 is formed on the oxide film 203 that has been formed in the step illustrated in FIGS. 2G-1 and 2G-2, and the silicon substrate 103 is dry etched to some extent (FIGS. 4A-1 and 4A-2). The opening in the resist mask 301 is narrower than the opening in the oxide film 203. Next, the resist mask 301 is stripped and a resist mask 302 is formed on the oxide film 203, and dry etching is performed until the oxide film 201 (see FIG. 2B-2) is exposed (FIGS. 4B-1 and 4B-2). The dry etching is performed by using the Bosch process. In the Bosch process, etching and forming of a protective layer are alternately performed, so that a high etching rate and a high aspect ratio can be realized. After the dry etching, the resist mask 302 is stripped and the oxide film 203 is removed. The groove 111 has a cross-sectional shape having a substantially reduced width at the bottom.

With the method of the second embodiment, which uses wet etching, the disposition of the groove 111 is limited due to crystal anisotropy of silicon. However, the method of making the third embodiment, which uses dry etching, is free from such limitation, and the groove 111 can be more flexibly disposed.

Fourth Embodiment

Figure 5A:
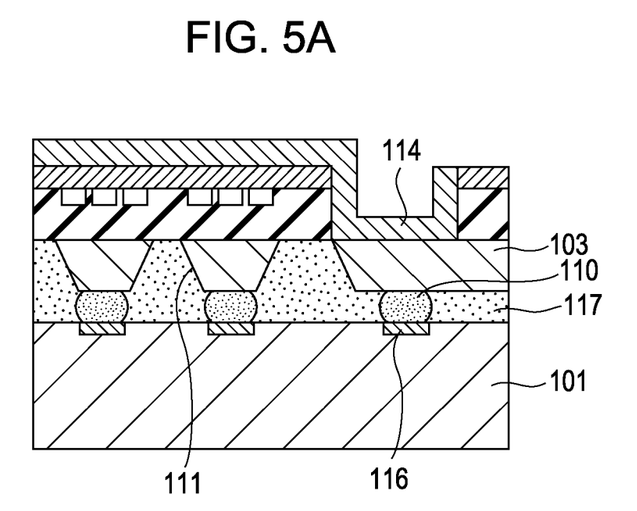
FIGS. 5A and 5B illustrate a CMUT according to a fourth embodiment of the present invention.
Figure 5B:
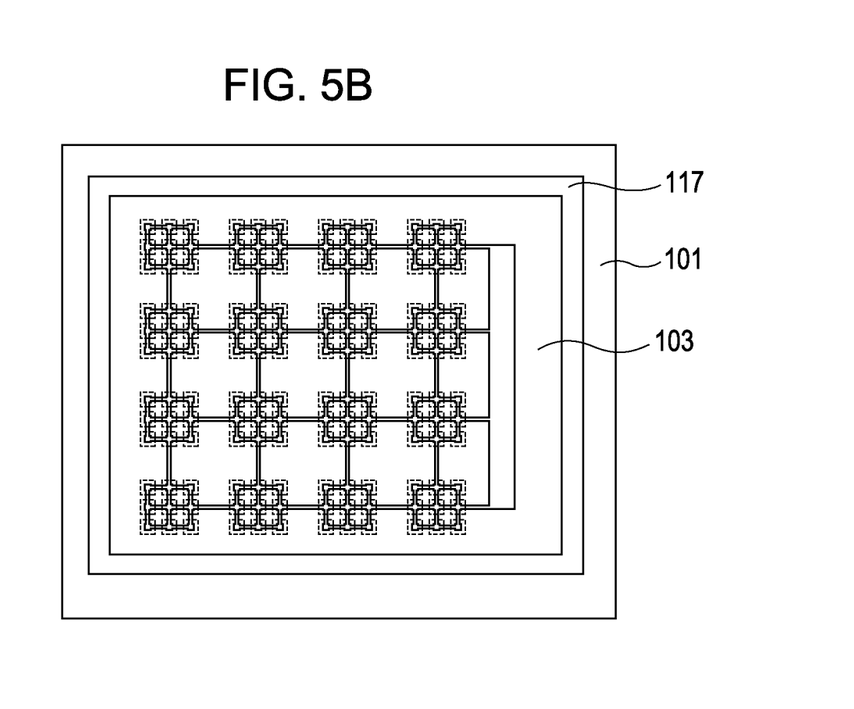

Referring to FIGS. 5A and 5B, the fourth embodiment will be described. A CMUT according to the fourth embodiment is a modification of the CMUT of the first embodiment. As illustrated in the sectional view of FIG. 5A, the CMUT of the fourth embodiment has a structure in which the CMUT illustrated in FIG. 1A is filled with an underfill 117 that is an epoxy filler. FIG. 5B is a top view of FIG. 5A. As illustrated in FIG. 5A, a space between the silicon substrate 103 and the circuit board 101 is filled with the underfill 117 and the silicon substrate 103 is joined to the circuit board 101 with the filler therebetween. The underfill 117 is used in order to reinforce a part that is fragile because of the use of trench (groove) structure and to reduce deformation that is generated due to difference in the thermal expansion coefficients between the silicon substrate 103 and the circuit board 101 when the silicon substrate 103 is soldered to the circuit board 101.

Moreover, the underfill 117 is used in order to achieve match of acoustic impedance in a region between the silicon substrate 103 and the circuit board 101 and to minimize the effect of reflection of ultrasound (suppress reflection). The acoustic impedance is adjusted to a target value by mixing fine particles of tungsten or alumina with DEVCON-B (registered trade mark), which is epoxy filler. For example, the acoustic impedance of the circuit board 101 is 5.6 kg/s·cm², and the acoustic impedance of DEVCON-B is 4.7 kg/s·cm². For example, by mixing fine particles of tungsten with DEV- CON-B with a mass ratio of about 40% so that the fine particles are uniformly dispersed in DEVCON-B, the target acoustic impedance of 5.6 kg/s·cm² can be realized. However, the larger the amount of tungsten, the higher the viscosity is. Therefore, air bubbles may be generated when the underfill 117 is poured into the space. The bubbles remain in a perpendicular trench, from which air is not easily vented, and may cause an acoustic problem. That is, if bubbles remain, most of ultrasound that comes from the upper side of FIG. 5A is reflected by the bubbles due to the difference in acoustic impedance between the bubbles and the epoxy filler, and a part of the reflected ultrasound returns to the CMUT and generates a new signal. The signal becomes noise, which may cause reduction in the signal strength or may interfere with the signal so that the strength of the signal varies.

In the fourth embodiment, which has a tapered trench structure, when epoxy filler is poured into the groove 111, the epoxy filler flows along side walls of the groove 111. At this time, even when drops of the epoxy filler have large sizes due to viscosity, the epoxy filler can be smoothly poured into the groove 111 without being obstructed at the opening of the groove 111 because the groove 111 is tapered. In order to smoothly pour the epoxy filler into the groove 111, the surface of the groove 111 of the trench structure may be activated by subjecting the surface to plasma treatment. Also at this time, plasma can easily reach the bottom of the groove 111 because the groove 111 is tapered. As a result, the epoxy filler can be easily poured into the bottom of the groove 111. Moreover, because the groove 111 is tapered, the epoxy filler can be poured into the groove 111 while maintaining a gap between the side wall and the epoxy filler so that air can be vented through the gap. As a result, the amount of air that remains in the epoxy resin is reduced, generation of bubbles is suppressed, so that acoustic problem can be reduced or eliminated and wide band characteristics can be realized. That is, in general, a capacitance-type electromechanical transducer device has band characteristics that are wider than those of a piezoelectric transducer. The fourth embodiment realizes such characteristics more securely and stably than a general capacitance-type electromechanical transducer device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-172723 filed Jul. 24, 2009 and No. 2010-096557 filed Apr. 20, 2010, which are hereby incorporated by reference herein in their entirety.

What is claimed is:

1. An electromechanical transducer device comprising:
   a substrate that is conductive; and
   a plurality of electromechanical transducer elements disposed on a first surface of the substrate, each of the plurality of electromechanical transducer elements comprising:
      a supporting unit provided on the first surface of the substrate;
      a membrane provided on the supporting unit so as to interpose a cavity between the substrate and the membrane;
      a first electrode provided on the first surface of the substrate; and
      a second electrode formed over the membrane,
   wherein a groove that electrically isolates the plurality of electromechanical transducer elements from each other is formed in the substrate, the groove extending from a second surface of the substrate toward the first surface of the substrate and extending directly and entirely onto the first electrode, the second surface being opposite the first surface,
   wherein an opening of the groove formed on the first surface of the substrate and the supporting unit overlap with each other,
   wherein the opening of the groove formed on the first surface of the substrate and the cavity do not overlap with each other,
   and
   wherein a width of the groove on the first surface of the substrate is smaller than a width of the groove on the second surface of the substrate.

2. The electromechanical transducer device according to claim 1,
   wherein the groove has a cross-sectional shape in which a width thereof continuously or discontinuously increases from the first surface side toward the second surface side.

3. The electromechanical transducer device according to claim 1,
   wherein a side surface of the substrate where the groove is formed is stepped.

4. The electromechanical transducer device according to claim 1,
   wherein a side surface of the substrate where the groove is formed is a flat surface that is inclined with respect to the substrate.

5. The electromechanical transducer device according to claim 1,
   wherein the substrate is a single crystal silicon.

6. The electromechanical transducer device according to claim 1,
   wherein a filler is provided in the groove.

7. The electromechanical transducer device according to claim 6,
   wherein the substrate is joined to a circuit board with the filler therebetween.

8. The electromechanical transducer device according to claim 1,
   wherein the each of the plurality of electromechanical transducer elements comprising a supporting unit,
   wherein the membrane is provided on the supporting unit, and
   wherein the groove is overlapped with the membrane and the supporting unit.

9. The electromechanical transducer device according to claim 1,
   wherein the groove is provided under the supporting unit.

10. The electromechanical transducer device according to claim 1, wherein the each of the electromechanical transducer elements further comprises:
    a first element and a second element,
    wherein the substrate corresponds to the first electrode of the each of the electromechanical transducer elements, and
    wherein the membrane corresponds to the second electrode of the each of the electromechanical transducer elements.

11. The electromechanical transducer device according to claim 1,
    wherein the first electrode is electrically connected to a portion of the substrate that is surrounded by the groove.

* * * * *